United States Patent
Greive

(10) Patent No.: US 9,521,002 B2
(45) Date of Patent: Dec. 13, 2016

(54) METHOD FOR COPY-PROTECTED STORAGE OF INFORMATION ON A DATA CARRIER

(71) Applicant: Vorwerk & Co. Interholding GmbH, Wuppertal (DE)

(72) Inventor: Volker Greive, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 230 days.

(21) Appl. No.: 14/271,636

(22) Filed: May 7, 2014

(65) Prior Publication Data

US 2014/0337631 A1 Nov. 13, 2014

(30) Foreign Application Priority Data

May 8, 2013 (DE) .................. 10 2013 104 735

(51) Int. Cl.
   - *H04L 29/06* (2006.01)
   - *H04L 9/32* (2006.01)
   - *G06F 21/10* (2013.01)
   - *G06F 21/78* (2013.01)
   - *A47J 36/32* (2006.01)

(52) U.S. Cl.
   CPC .............. *H04L 9/3247* (2013.01); *A47J 36/32* (2013.01); *G06F 21/10* (2013.01); *G06F 21/78* (2013.01)

(58) Field of Classification Search
   CPC ........... A47J 36/32; G06F 21/10; G06F 21/44; G06F 21/78; H04L 9/32; H04L 9/3247; H04L 12/2816; H04L 12/2818

USPC .......................................................... 713/176
   See application file for complete search history.

(56) References Cited

U.S. PATENT DOCUMENTS

| | | | | |
|---|---|---|---|---|
| 2002/0016838 A1* | 2/2002 | Geluc | ..................... | G06F 21/88 709/224 |
| 2004/0172469 A1* | 9/2004 | Takahashi | ........... | H04L 43/0817 709/224 |
| 2006/0190266 A1* | 8/2006 | Tanigawa | .............. | D06F 39/003 704/273 |
| 2010/0308978 A1* | 12/2010 | Brown | .................. | H04L 9/3252 340/10.42 |

(Continued)

FOREIGN PATENT DOCUMENTS

| | | |
|---|---|---|
| DE | 10 2007 059 236 A1 | 6/2009 |
| DE | 10 2009 018 941 A1 | 11/2010 |

*Primary Examiner* — Yogesh Paliwal
(74) *Attorney, Agent, or Firm* — Collard & Roe, P.C.

(57) ABSTRACT

A method for storing digital data information on a data carrier and for reading the information therefrom uses a disk having an individual digital identifier. A signature is formed, and the information includes information items, which can be processed by a first electronic data processing device only if the identifier and the signature are in a predefined relation to one another. To supply a household appliance operated by an electric motor with process control data, while ensuring that only original data are used, the information components can be processed by a second electronic data processing device even if the signature and the identifier are not in the predefined relation to one another. Also, a household appliance operable by an electric motor, in particular a food processor, has an electronic data processing device. A system and an integrated semiconductor circuit also realize the features for storing digital data information.

12 Claims, 1 Drawing Sheet

(56) References Cited

U.S. PATENT DOCUMENTS

2013/0074047 A1\* 3/2013 Herden .............. G05B 19/0426
717/126

\* cited by examiner

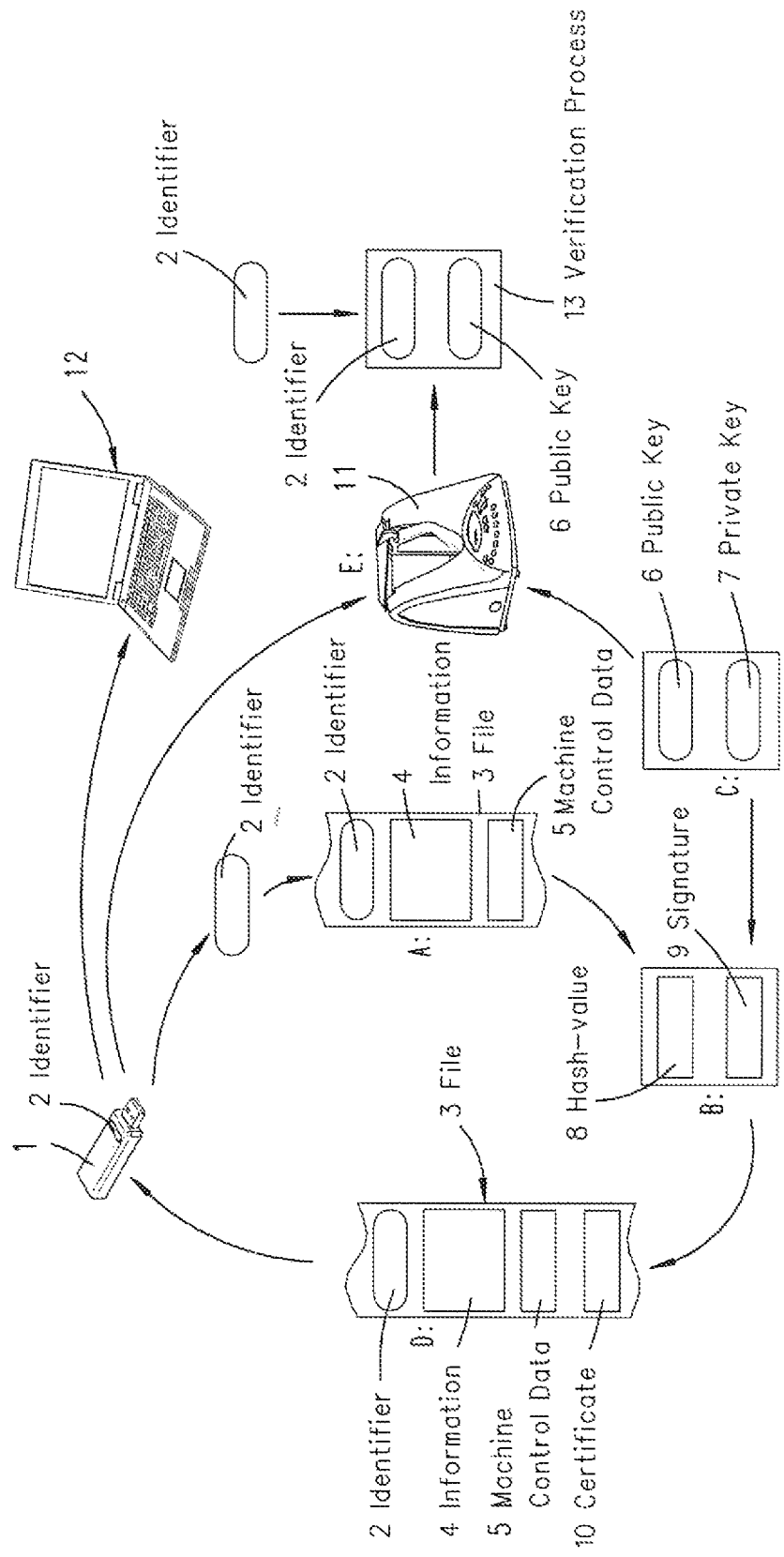

METHOD FOR COPY-PROTECTED STORAGE OF INFORMATION ON A DATA CARRIER

CROSS REFERENCE TO RELATED APPLICATIONS

Applicant claims priority under 35 U.S.C. §119 of German Application No. 102013104735.1 filed May 8, 2013, the disclosure of which is incorporated by reference.

BACKGROUND OF THE INVENTION

1. Field of the Invention

The invention relates to a method for storing information consisting of digital data on a data carrier and for reading the information from the data carrier, the data carrier having a unique digital identifier, wherein a signature comprising the individual identifier is formed, wherein the information contains at least information components which can be processed by a first electronic data processing device only if the individual digital identifier and the signature are in a predefined relationship to one another.

2. Description of the Related Art

A method of the aforementioned type is described in DE 102009018941 A1. Here, access to an encrypted file system of a storage medium is designed to be controlled by using an individual identifier of the storage element. Each storage element created has a serial number which is individually assigned to the storage element, and therefore, unique to it. In the prior art, a sub-key is formed from this serial number and a reference to a key from a key group. The access to the file system using a Secure Media Access Station is intended only to be allowed if the identifier has a correct relationship with respect to the key. Copying the key onto another storage medium therefore results in access being denied. The sub-key, or an identifier obtained therefrom by means of a hash function, should be signed with a personal key, for example, based on an asymmetric crypto-system, for example, based on RSA-2048.

DE 102007059236 A1 discloses electric-motor driven household appliances, in particular kitchen appliances, hereafter also referred to under the trade name "Vorwerk Thermomix". Electric-motor operated household appliances belonging to the prior art are capable of working according to a program stored in a program memory, wherein the program contains temporally consecutive program steps and the program steps are differentiated by different types of process parameters, such as processing temperature or rotation rate of an agitator, or duration of a process step. The associated process control data are stored in a storage device of an integrated semiconductor circuit.

SUMMARY OF THE INVENTION

The object of the invention is to specify measures with which a household appliance can be supplied with process control data and/or data that are reproducible with a human-machine interface, while at the same time ensuring that only original data are used.

The object is achieved by the invention specified in the claims.

With the method according to the invention information items consisting of digital data are provided on a data carrier. These digital information items can be verified for authenticity is using the individual, signed identifier. They are processed, i.e. read and recognized, by the electronic data processing device only if the individual digital identifier, which can be a unique serial number, and the signature generated during production of the data carrier or when storing the digital data on the data carrier, are in a predefined relation to one another. The relation can be implemented in the form of an encryption. It may be a checksum relation between the individual identifier of the data carrier and the signature. The digital signature can be generated in known manner using a hash function, wherein previously the individual digital identifier, i.e. the serial number of the data carrier, in particular a USB stick, is written to the file carrying the information, or is written to a separate file, albeit one related to the same file system. This file, signed in known manner with a private key, is then stored on the data carrier. Suitable methods here are, for example, the above-mentioned asymmetric crypto-systems. The electronic data processing device arranged in the electric-motor operated household appliance positioned is programmed such that it accepts the removable data carrier or the information stored thereon only if the signature can be verified. If a crypto-system consisting of a private and a public key is used, the signature can be verified using the public key. In this preferred variant the relation is established by using the public key and comparing the serial number stored in the file with the actual serial number of the data carrier. On successful verification, the individual digital identifier stored in the file, i.e. in particular the serial number, is compared with the serial number of the data carrier itself and tested as to whether the two numbers are identical. If the serial numbers do not match, or if the signature cannot be verified due to manipulation of the information stored on the data carrier, then processing of the information stored on the digital data carrier is refused. According to the invention however, the signature undergoes no such encryption that would allow the information to be read only by means of an appropriate key. According to the invention rather, it is provided that the information contains at least information components which can be processed, i.e. read and evaluated, by a second electronic data processing device, such as a standard PC or other visual display unit, and which in particular can be reproduced on a human-machine interface, even if the signature and the identifier are not in the above described relation to one another, i.e. a verification fails or the serial number stored in the file does not match the serial number of the data carrier. The information stored on the disk can have information components which are qualitatively different from one another. Thus the information can have information components items in the form of text files, audio files, video files or image files. This data, which can be acquired by a user by sensory means, can be output via different man-machine interfaces; for example, text files and image files can be displayed on a screen of a PC. The relevant files can be stored in PDF-format, in RTF-format, in HTML-format, in XML-format, in the SQLite format or in a different format, in particular using the "mark-up-language concept", wherein the serial number can be stored in non-displayable components of the files. The serial number can also be stored in a separate file, but one which is also stored on the disk. At least this file is signed. The information can also contain machine control data. The machine control data are preferably process control data that include process parameters in a suitable protocol, wherein the process parameters can be the duration of a process, the temperature of a process step and/or the rotation rate of an agitator, among other things. This process control data can also be stored on the data carrier in encrypted form, so that they cannot be processed by a second electronic data processing device.

In addition, the invention relates to a system for implementing the method, consisting of a data carrier on which information consisting of digital data is stored, wherein the data carrier has an individual digital identifier, which like the information is also stored on the disk, wherein the individual identifier is signed, however. The system also has an electronic data processing device that is programmed such that it does not allow processing of the digital data stored on the data carrier if the individual digital identifier and the signature are not in a predefined relation to one another, i.e. if either a signature is not verifiable or the digital identifier stored on the data carrier does not match the actual digital identifier of the data carrier. According to the invention the electronic data processing device is an integral part of an electric-motor operated household appliance, in particular a kitchen appliance, and particularly preferably part of a device for the preparation of food according to a predefined recipe, where the recipe is stored on the disk as information.

In addition, the invention relates an electric motor operable household appliance, in particular a food processor, the has an electronic data management system is programmed, so that it is capable of data from a data management system in connection with the electronic interface bringbaren disk can read, where the electronic data management system is programmed so that the signature of the digital media stored on the digital data verified and, if stored on the disk a successful verification of the signature mitumfassten value for an individual digital identifier with the actual digital identifier of the media compares. The appliance is also set up such that it refuses to allow processing of the information if either the verification of the signature fails or the stored individual digital identifier does not match the actual individual digital identifier of the data carrier. The household appliance according to the invention is also preferably capable of carrying out a processing process composed of a plurality of sequential steps, in particular a food preparation process, wherein the process data are control data stored on the digital data carrier.

In addition, the invention relates to an integrated circuit, in particular in the form of a storage medium with an integrated memory and an integrated controller, wherein digital data are stored on the integrated memory and the storage medium comprises an individual digital identifier. It is essential that the information stored on the storage medium is a processing recipe that can be displayed on a human-machine interface, for example a display screen, in textual and/or in graphical form and/or comprises process control data which can be executed by a household appliance. The built-in memory contains a signature stored in the form of digital data that are verifiable by an electronic data processing device of the aforementioned type.

BRIEF DESCRIPTION OF THE DRAWINGS

An exemplary embodiment is explained below based on the attached drawing.

The sole FIGURE shows, in the form of a block circuit diagram, the sequence of a method for storing an information item consisting of digital data and for reading out this information, and a system which works according to this method.

DETAILED DESCRIPTION OF PREFERRED EMBODIMENTS

At point E of the FIGURE an electrically operated food processor is shown, as described by DE 102007059236 A1.

The content of DE 102007059236 A1 is hereby fully incorporated into the disclosed content of the present invention, including for the purpose of incorporating features into claims of the present invention.

Reference numeral 11 characterizes an electronic data processing device integrated into the electronic food processor. This first electronic data processing device 11 can be implemented by a microcontroller. The food processor has an interface, not shown, with which an external storage medium can be placed into operative connection with the electronic data processing device 11.

The reference numeral 1 designates a standard commercially available USB stick, which has a universal serial interface with which the USB stick 1 can be brought into communication with the electronic data processing device 11 of the food processor or with a second electronic data processing device 12 in the form of a commercially available PC.

The digital data carrier 1 has a storage medium with an integrated memory and an integrated controller. It contains an individual identifier 2 in the form of a universal, i.e. a unique, serial number. This serial number is marked symbolically in FIG. 1 with the reference numeral 2.

The reference numeral 3 designates a file having digital information items 4 and 5. The digital information 4 can be information which is displayable on a computer terminal of a PC 12, such as text or images, but also audio or video files. Such files, for example PDF, RTF, HTML, XML, SQLite files, contain not only the pure information, but additional information which is stored there as additional tags or metadata. Also stored in the same file 3, or in a tile belonging to the same file system, as information which is invisible or not detectable by sensory means, is a value corresponding to the serial number 2 of the data carrier 1. In addition, the file 3, which can also consist of an ensemble of a plurality of files, may carry machine control data 5 that are process control data with which the electronic data processing device 11 of the food processor can run a food preparation program, wherein the process control data 5 include at least the duration of an individual processing step, the temperature of the processing step and an agitator rotation rate.

At the point of the flow chart designated A, a file or an ensemble of a plurality of files 3 is therefore created, which includes the individual identifier 2, a processing recipe 4 in plain text and optimally assigned machine control data 5.

At the point designated B, with a hash-function 8 a multi-digit verification code is created, which characterizes the individuality of the file or the ensemble of files 3. The hash-value can be generated, for example, using the Message Digest 2 (MD2) algorithm, but also by similar algorithms, for example MD 4, MD 5 or SHA 256 etc. The algorithm used is preferably SHA 256, because it is considered the best compromise between security and processing speed.

At point C of the flowchart an asymmetric key pair is shown, which contains a public key 6 and a private key 7. The two key 6, 7 have the property that files encrypted with a public key 6 can only be decrypted with the corresponding private key 7 or—and this is exploited according to the invention—of signing files with the private key, wherein the signature is verifiable only using the public key 6. The relevant key pair can be generated in a known manner according to the RSA algorithm with a sufficient number of bits.

When using the public key 7 the hash value 8 generated at point B is signed. The resulting signature 9 includes at least the value of the individual serial number 2. In the exemplary embodiment the signature 9 extends however to the entire file 3 which comprises the information 4, 5 and the individual digital identifier 2.

The point D symbolizes the fact that the digital signature 9 is added as a certificate 10 in the file 3 or the ensemble of files 3.

This file is 3 or the file system 3 as the case may be is now stored on the digital data carrier 1 from which the individual digital identifier 2 has been extracted.

If the information 4, 5, is also to be stored on a plurality of other data carriers, then appropriate individual signatures 9 must be generated, which are saved on the respective data carrier 1 together with the information 4, 5.

If the information 4, 5 stored on the data carrier 1 are changed, then the first electronic data processing device 11 cannot verify the signature 9 or the certificate 10. The verification is carried out using the public key 6, which is used by a program which is implemented in the first electronic data processing device 11 in the food processor. The verification process 13 initially proceeds by checking the signature 9 by means of the public key 6, and then the checking of the serial number 2 stored in the file 3 against the actual serial number 2 of the data carrier 1. If the file 3 or the information belonging to an ensemble of files 3 has been copied to a different data carrier which has a different serial number 2, then the processing of the information 4, 5 is refused by the first electronic data processing device 11, because the serial numbers 2 do not match. The same is true for corrupted data, because then the signature 9 cannot be verified.

However, the information 4 which is perceptible by sensory means can still be processed by a standard PC, which is represented by a second electronic data processing device 12, i.e. displayed or made otherwise detectable by sensory means.

In this way, it is possible to copy, for example, readable recipes for food preparation as often as desired. The copies can then be read and displayed by any PC 12. They can not however be used to prepare meals using the food processor which comprises the first electronic data processing device 11.

LIST OF REFERENCE NUMERALS

1 USB-stick
2 Identifier
3 File
4 Information
5 Information
6 public key
7 private key
8 Hash-value
9 digital signature
10 Food processor
11 First electronic data processing device
12 Second electronic data processing device
13 Verification

What is claimed is:

1. A method for storing information comprising digital data on a data carrier and reading the information from the data carrier, the method comprising the steps of:
    a) providing a data carrier comprising an individual digital identifier;
    b) forming a signature comprising the individual digital identifier;
    c) providing information comprising a processing recipe and assigned machine control data;
    d) processing the machine control data with a first electronic data processing device and using the machine control data to control a machine only if the individual digital identifier and the signature are in a predefined relation to one another; and
    e) reading and reproducing the processing recipe with a second electronic data processing device comprising a human-machine interface, regardless of whether the signature and the individual digital identifier are in the predefined relation to one another;
    wherein the first electronic data processing device is part of a household appliance operable by an electric motor and/or the machine control data is a program sequence for a household appliance operable by electric motor.

2. The method according to claim 1, wherein the processing recipe is a food preparation recipe and/or wherein the machine control data comprises process parameters.

3. The method according to claim 1, wherein to create the signature an asymmetric key pair consisting of a private key and a public key is used, wherein the signature is generated using the private key, and a verification is carried out by the first electronic data processing device using the public key.

4. The method according to claim 1, wherein to generate the signature either the information supplemented by the individual digital identifier is encrypted with a private key or a hash-value formed therefrom is encrypted with the private key.

5. The method according to claim 1, wherein the signature is part of a file stored on the data carrier and comprising the information and the individual identifier, or is a separate file stored on the data carrier.

6. The method according to claim 1, wherein the information is stored on the data carrier as a "mark-up language" file.

7. The method according to claim 1, wherein the individual digital identifier is a unique serial number.

8. A system for carrying out a method in accordance with claim 1, the system comprising at least one non-transitory data carrier, on which information comprising digital data is stored, wherein the non-transitory data carrier comprises an individual digital identifier, wherein a signature comprising the individual digital identifier is stored on the non-transitory data carrier, wherein the information has at least first information components, which can be processed by a first electronic data processing device only if the individual digital identifier and the signature are in a predefined relation to one another, wherein the first data processing device is part of a household appliance operated by electric motor.

9. The system according to claim 8, wherein the information comprises at least one processing recipe and/or assigned machine control data.

10. The system according to claim 8, wherein the non-transitory data carrier is a USB stick.

11. The method according to claim 1, wherein the processing recipe is reproducible in textual and/or graphical form.

12. An integrated semiconductor circuit with a control circuit for serial or parallel communication with a first electronic data processing device and a second electronic data processing device, the integrated semiconductor circuit comprising:
    a storage device;
    an individual digital identifier;
    information comprising digital data stored on the storage device, the information comprising a processing recipe and associated machine control data for a household appliance operable by an electric motor; and a signature comprising the individual digital identifier stored on the storage device,
wherein the individual digital identifier and the signature are in a predefined relation to one another,
the first electronic data processing device can only handle the machine control data stored on the storage device if the individual digital identifier and the signature are in the predefined relation to one another, and
the second electronic data processing device reads and reproduces the processing recipe, regardless of whether the individual digital identifier and the signature are in the predefined relation to one another.

\* \* \* \* \*